No. 671,516. Patented Apr. 9, 1901.
S. B. HEGNER.
EGG BEATER.
(Application filed July 14, 1900.)
(No Model.)
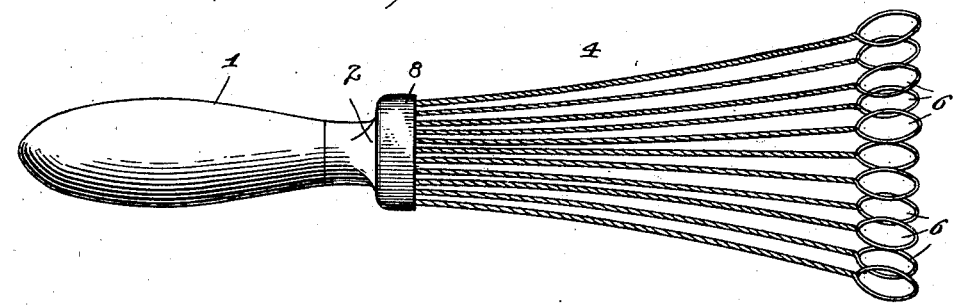
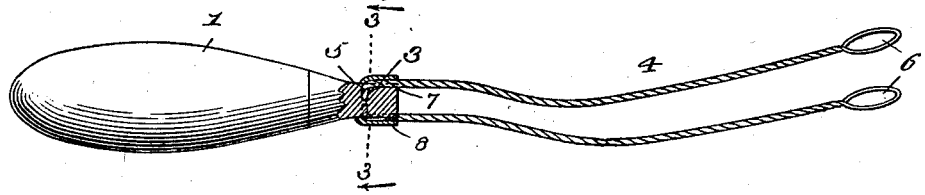
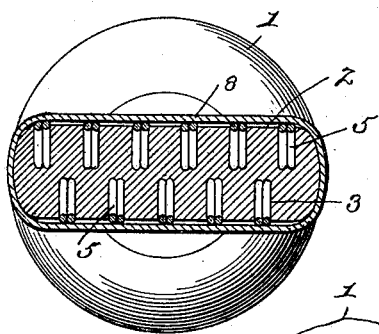
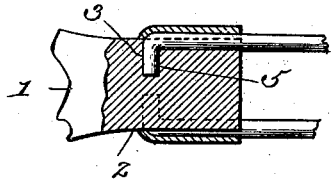
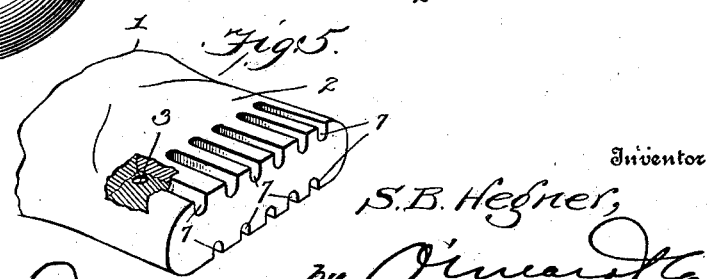
Witnesses
J. C. Shaw
Clarence Shaw
Inventor
S. B. Hegner,
by Jmeardt Co
Attorneys
THE NORRIS PETERS CO., PHOTO-LITHO., WASHINGTON, D. C.

UNITED STATES PATENT OFFICE.

STELLA B. HEGNER, OF SEWICKLEY, PENNSYLVANIA.

EGG-BEATER.

SPECIFICATION forming part of Letters Patent No. 671,516, dated April 9, 1901.

Application filed July 14, 1900. Serial No. 23,663. (No model.)

*To all whom it may concern:*

Be it known that I, STELLA B. HEGNER, a citizen of the United States, residing at Sewickley, in the county of Allegheny and State of Pennsylvania, have invented a new and useful Egg-Beater, of which the following is a specification.

My invention relates to egg-beaters; and it has for its object to produce a device of this kind which will be exceedingly simple and efficient in its operation; and it consists in the improved construction of the same, as will be hereinafter more fully set forth.

In the accompanying drawings, in which the same reference-numerals indicate corresponding parts in each of the views in which they occur, Figure 1 is a plan view of my improved egg-beater. Fig. 2 is a longitudinal sectional view of the same. Fig. 3 is an enlarged transverse sectional view taken through the end of the handle on line 3 3 of Fig. 2. Fig. 4 is an enlarged detail view showing the beaters made of a simple piece of metal. Fig. 5 is a perspective view of the lower end of handle.

Referring more particularly to the drawings, 1 indicates a handle, which may be of any desired shape and size, but the inner end is preferably flattened, as shown at 2, and provided with holes or perforations 3.

The beaters 4 each comprise a piece of wire, the inner end of which is bent at an angle to form a projection 5, which is adapted to fit in one of the holes in the handle, and the outer end is preferably formed with a loop or eye 6, standing at right angles to the projection. If desired, the beaters can each be formed from a piece of wire doubled upon itself to form the loop 6 and twisted together throughout its length and having the ends bent to form the projection.

The beaters are secured to the handle by inserting the projections into the different holes, and by making the end of the handle flat the beaters will stand in two planes, one above the other, with the free ends slightly farther apart than the inner ends. The intermediate portions of the beaters are bent slightly downward near the handle and curved slightly upward toward the free ends, whereby they assume a slight spoon shape.

The end of the handle is provided with slight grooves 7, which extend from the perforations 3 to the end of the handle for the reception of the inner end of the beaters when the projections are inserted in the holes. A cap or ferrule 8 is slipped over the ends of the beaters and the end of the handle after the projections have been inserted in the holes, thereby firmly holding each beater in its respective groove in the handle.

If desired, the projection can be inserted into each hole from opposite sides of the handle, whereby the beaters of the two sets will stand directly opposite each other, or the holes can be so arranged that the beaters will alternate with each other, whereby the loop at the outer end of each beater of one series will overlap the adjacent portions of two loops of the other series, thus preventing the beaters from following each other in the same path through the material being operated upon. The outer ends of the beaters are preferably made to diverge slightly from each other, so as to prevent the wire loops of the different beaters of each series from interfering with each other.

The ferrule can be formed from any suitable non-corrosive material, as tin or aluminium, and the beaters can be formed from any suitable flexible material, as ordinary wire of the desired size.

In operating my improved beater the handle is grasped in one hand and moved in such a manner as to cause the outer portions of the beaters to be passed rapidly through the eggs. As the beaters are flexible, it is evident that the movement of the handle will cause their free ends to be moved toward and from each other, especially as they are being moved around in the ellipse in which they are generally moved, thereby causing them to pass through varying curves in their lateral movement and also to pass through the material in different planes as they move vertically. By arranging the two series of beaters slightly fan-shaped a great number of beaters can be arranged in each series and the outer end of each one can be provided with a loop, which will add to the effectiveness of operation in beating the eggs.

Having thus fully described my invention, what I claim as new, and desire to secure by Letters Patent, is—

1. An egg-beater comprising a handle, one end of which is flattened, and a series of rodlike beaters secured to each flattened surface, the beaters of one series alternating with those of the other and the beaters of each series being arranged fan-shaped and having their outer ends each provided with a loop, substantially as described.

2. An egg-beater comprising a handle, one end of which is flattened, perforated and grooved longitudinally, a fan-shaped series of wire beaters secured to each flattened surface, each beater consisting of a wire doubled upon itself to form a loop at the outer end and having its intermediate portion curved downward and its free end bent at an angle to fit in the groove and perforation of the handle, and a ferrule over the inner ends of the beaters and the flattened end of the handle, substantially as described.

STELLA B. HEGNER.

Witnesses:
G. F. H. SAVAGE,
A. KEEPLEY.